No. 889,136. PATENTED MAY 26, 1908.
J. P. KARNS.
ROTATING MEANS FOR RECIPROCATING SHAFTS.
APPLICATION FILED JUNE 8, 1907.
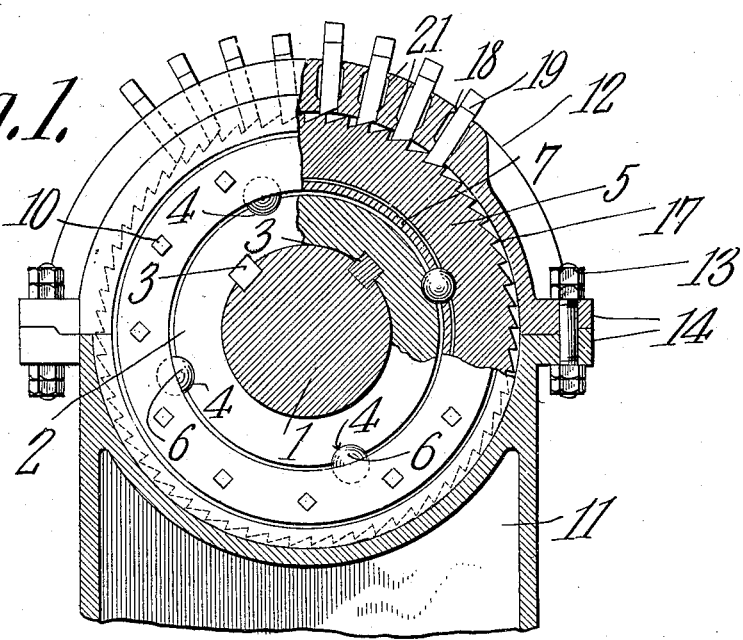
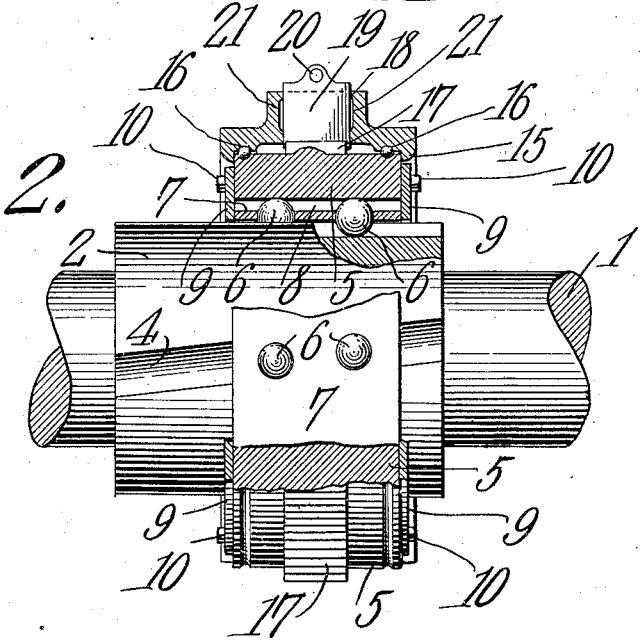
WITNESSES:
John P. Karns,
INVENTOR.
ATTORNEYS

UNITED STATES PATENT OFFICE.

JOHN PRUE KARNS, OF BOULDER, COLORADO, ASSIGNOR TO THE J. B. KARNS TUNNELING MACHINE CO., OF BOULDER, COLORADO.

ROTATING MEANS FOR RECIPROCATING SHAFTS.

No. 889,136.
Specification of Letters Patent.
Patented May 26, 1908.

Original application filed February 23, 1907, Serial No. 358,867. Divided and this application filed June 8, 1907. Serial No. 377,982.

*To all whom it may concern:*

Be it known that I, JOHN PRUE KARNS, a citizen of the United States, residing at Boulder, in the county of Boulder and State of Colorado, have invented a new and useful Rotating Means for Reciprocating Shafts, of which the following is a specification.

This invention has reference to improvements in rotating means for reciprocating shafts designed more particularly for use in connection with a drilling machine such as shown and described in my application No. 358,867, filed Feb. 23, 1907, of which the present application is a division.

The present invention will be more clearly understood by a consideration of the conditions under which it is designed to operate.

In a drilling machine such as is shown in my aforesaid application the parts are of massive structure and the whole machine is designed to withstand heavy jars or shocks repeatedly received through long periods of time. This will be more apparent when it is considered that the machine is designed for the drilling of tunnels or bores up to eighteen or more feet in diameter, through all sorts of materials, including hard rock. The entire structure, therefore, is of great weight, and for the purpose of drilling the shaft carrying the drill-head is made to reciprocate for the necessary distance to deliver blows such as may be needed to chip away the material in the path of the drill-head, the action being similar to the action of a stone-mason's chisel. In order that such blows may be properly distributed, it is also necessary that the shaft and drill-head carried thereby be slowly rotated, and it is to this purpose, *i. e.*, that of rotating the reciprocating shaft, that the present invention is particularly directed.

It is therefore the object of the present invention to provide means whereby the reciprocatory motion imparted to the drill-head shaft for the purpose of causing the drill-head to operate will also react in a manner to at the same time slowly rotate the shaft and drill-head carried thereby to a sufficient extent at each reciprocation of the drill-head to present the cutting blades in the drill-head to new surfaces to be cut. To this end, there is provided a rotative toothed or ratchet member constrained to move about its axis in one direction only by suitable pawls, and coacting with this ratchet member there is another member fast on the shaft and capable of reciprocating therewith and provided with threads or grooves of long pitch, so connected to the ratchet member that when the shaft is moved longitudinally in one direction the ratchet member will be turned upon its pivot in the direction of rotation permitted by the pawls, and when the shaft is moved longitudinally in the other direction this ratchet member, being held against rotation in such direction, will react through the screwthreads or grooves to cause the shaft to turn on its own longitudinal axis for a distance commensurate with the pitch of the threads and the longitudinal movement of the shaft.

Furthermore, the invention comprises means whereby when it is desirable to give to the shaft a less length of stroke than the full length of stroke, there will still be imparted to the shaft a movement of rotation. Thus, if the full length of stroke be sufficient to impart to the shaft a rotative movement equal to the length of a ratchet tooth upon the ratchet member, a stroke of less extent than the full length stroke will impart to the shaft rotative movement correspondingly less than that imparted to it by the full length stroke.

The means which I have devised for accomplishing the several results set forth will be best understood by reference to the following description, taken in connection with the accompanying drawings forming part of this specification, in which,—

Figure 1 is a cross section, partly in elevation, of the mechanism for imparting rotary motion to the drill-head shaft; and Fig. 2 is a longitudinal section, partly in elevation, of the same structure.

Referring to the drawings, there is shown a shaft 1 which, it will be understood, is to carry a suitable drill-head such as shown and described in my aforesaid application. Upon this shaft there is secured a sleeve 2 by means of keys 3 or otherwise. This sleeve has upon its outer surface a number of grooves 4 extending longitudinally thereof at a slight angle to the axis of the shaft. Encircling the sleeve 2 is a collar 5 carrying on its inner face a number of anti-friction balls 6 arranged to travel in the grooves 4 and held to the collar 5 by an annular plate 7. The balls 6 engage in longitudinal grooves 8 formed in the inner face of the collar 5. The plate 7 is held to the collar 5 by end plates 9 made fast thereon at each end by bolts or screws 10 or otherwise.

The collar 5 is mounted in a bearing composed of a lower section 11, which may be formed on or secured to the bed plate of the drilling machine as will be seen from an examination of my aforesaid application, and this bearing is completed by a cap plate 12 secured to the lower section by suitable bolts 13 passing through ears 14 formed on both parts of the journal bearing at the meeting edges thereof. The collar 5 is confined in the bearing from moving laterally therein by an inwardly-projecting annular flange 15 formed on each side of both parts of the bearing, and in order to reduce the friction between the collar 5 and its journal bearing to a minimum a series of anti-friction balls 16 are arranged in suitable runways formed in both the collar and the journal box adjacent to the flanges 15.

Now, in the operation of the drilling machine the shaft 1 is reciprocated and the sleeve 2, participating in such reciprocation, is made so much longer than the collar 5 as to always remain within said collar. It will be seen that when the shaft is reciprocated the inclined grooves or threads 4 will tend to cause a rocking of the collar 5 about its axis, which latter is coincident with the axis of the shaft 1. The extent of this rocking of the collar 5, if unrestricted, is commensurate with the pitch of the grooves or threads 4. But as it is desirable that the greatest movement of rotation of the shaft should be only sufficient to present the drill-head cutter to fresh surfaces at each succeeding blow at a point closely adjacent to that point upon which the cutters have acted on the preceding blow, the pitch of these grooves 4 will be so long as to closely approach the plane of reciprocation of the shaft. Now, it is important that the rotary motion of the collar 5 be restricted to one direction only. For this purpose, the said collar has upon its periphery, midway between its ends, a series of ratchet teeth 17, and in the cap portion 12 of the journal bearing there are formed a number of radial slots 18 in which play gravity dogs 19, the inner ends of which are arranged to engage the teeth 17 on the collar 5 when the latter is turned in one direction, but which dogs are lifted by and ride over said teeth when the collar is turned in the other direction.

The collar 5 has a large number of teeth 17 disposed around its periphery for a purpose which will presently appear, and for this reason the dogs are necessarily quite thin. In order, therefore, to increase their weight so that they will act promptly and by gravity only, they are made quite wide, as shown in Fig. 2, and in order that these dogs may be readily removed when desired, an eye 20 is formed in the upper end of each where it projects from the slot receiving it.

With the conditions under which this invention is designed to be used it is desirable to avoid the use of springs to cause the dogs to seat themselves against the ratchet teeth, and, therefore, they are made to act by gravity only. It is consequently advisable to reduce the frictional contact between these dogs and the walls of the slots containing them. For this purpose, the walls of these slots are cut away both at the sides and ends of the dogs, as shown at 21, so that the dogs engage the slots only near the outer and inner portions thereof. Now, let it be supposed that the shaft 1 is reciprocated. If the first movement of reciprocation tends to turn the collar 5 in a direction to cause the teeth 17 to ride under the dogs, the collar will move rotatively for a distance corresponding to the angle of the grooves 4 to the plane of reciprocation of the shaft and also to the extent of reciprocation of the shaft. When, however, the movement of reciprocation of the shaft is in the reverse direction to that just described, the collar 5 is held against movement by certain of the dogs and the reaction between the grooves 4 and the balls 6 causes the shaft itself to be rotated a distance equal to the rotative movement imparted to the collar 5 during the first-mentioned direction of reciprocation of the shaft.

In the operation of drilling it is customary to reciprocate the drill-head through different distances from a minimum to a maximum to strike blows of various force, as desired. Under these conditions, the grooves 4, acting upon the collar 5, will cause the movement of this collar about its axis for distances commensurate with the degree of reciprocation of the shaft. Moreover, it is desirable that the shaft be rotated after each blow delivered by the drill-head. If but one dog 19 were used the shaft would be rotated only when the reciprocation was sufficient to cause a movement of the collar 5 to an extent to carry a tooth under that dog. But often the reciprocation of the shaft is of less extent, and under these conditions no rotative feeding of the shaft will occur. However, provision is made for causing a rotative movement of the shaft when the extent of reciprocatory movment is less than the maximum. For this purpose, a number of dogs 19 are used arranged in series so that a certain number of dogs will cover a larger number of teeth, which number of teeth, however, is less than the lowest multiple of the number of dogs, whereby provision is made for having a dog of a series engage a tooth even though the shaft be reciprocated but a fraction of its maximum extent of reciprocation. It is further advisable to provide for there being more than one dog in the same phase of operation, so that the structure may be relieved from too much strain, since a single dog engaging a single tooth might, in large machines, result in stripping the tooth from the collar. For this reason more than one series of dogs are used and in the drawings two such series are illustrated, but more than two series may be used when so desired.

For the purpose of the present description let it be supposed that the maximum reciprocation of the shaft will turn the collar 5 through an arc equal to the length of one tooth 17. Let it be further supposed that under such conditions some certain one of each series of dogs will each time engage a tooth 17, and let it also be supposed that the operator desires to strike a lighter blow, that is, the shaft is caused to reciprocate to a less extent than formerly, so that the tooth 17 engaged by the first-mentioned dog will no longer be carried from under the same to an extent sufficient to enable this dog to engage the next tooth. The other dogs of each series, however, are so spaced as to engage teeth 17 at various points upon their inclined surfaces and under the conditions just named, that is, under the condition of the shaft 1 reciprocating to a less extent than the maximum extent of reciprocation, some other one of the dogs of each series will by this time have dropped in front of the tooth and will prevent the return movement of the collar 5, and, consequently the shaft 1 will be rotated to a corresponding extent, although not that of the full length of a tooth.

In the particular structure shown in the drawings the minimum feed of the collar 5 will cause a rotation of the shaft 1 through an arc equal to one quarter of the length of a tooth, since there are seven teeth embraced by any four succeeding dogs, which number of dogs, in the particular structure illustrated, constitute a series. It will be understood, however, that any number of ratchet teeth and any number of dogs to a series and any number of series of dogs that will accomplish the purposes of the invention may be used.

While in the foregoing description the present invention has been limited in its application to drilling machines, it is to be understood that it may be applied to any other uses for which the invention may be adapted. It is also possible to rotate the shaft by reciprocating the collar 5 lengthwise of the shaft instead of reciprocating the shaft.

I claim:—

1. A means for imparting rotary motion to reciprocating shafts, comprising a wearing sleeve on said shaft secured to the same for movement therewith, said sleeve being provided with exterior pitched grooves, a collar surrounding said sleeve and provided with peripheral teeth, a series of dogs in the path of the teeth and held against participation in the movement of the shaft, and balls carried by the collar and entering the grooves in the sleeve and spaced apart in the direction of the length of the sleeve, said balls constituting keys connecting the collar and sleeve.

2. A means for imparting rotary motion to reciprocating shafts, comprising a wearing sleeve on said shaft secured to the same for movement therewith, said sleeve being provided with exterior pitched grooves, a collar surrounding said sleeve and provided with peripheral teeth, a series of dogs in the path of the teeth and held against participation in the movement of the shaft, balls carried by the collar and entering the grooves in the sleeve and spaced apart in the direction of the length of the sleeve, said balls constituting keys connecting the collar and sleeve, and an annular plate having through perforations for supporting and spacing the balls.

3. A means for imparting rotary motion to reciprocating shafts, comprising a wearing sleeve on said shaft secured to the same for movement therewith, said sleeve being provided with exterior pitched grooves, a collar surrounding said sleeve and provided with peripheral teeth, a series of dogs in the path of the teeth and held against participation in the movement of the shaft, an annular plate interior to the sleeve and provided with spaced perforations, end plates on the sleeve for holding the annular plate to the collar, and balls extending through the perforations in the annular plate and entering the grooves in the sleeve and constituting keys for connecting the sleeve and collar.

4. A means for converting reciprocatory motion into rotary motion, comprising equally-spaced rotative ratchet teeth moved in one direction of rotation by one movement of the reciprocating member, a series of radially movable gravity dogs in the path of the teeth and a fixed support in which said dogs are mounted.

5. A means for converting reciprocatory motion into rotary motion, comprising equally-spaced rotative ratchet teeth moved in one direction of rotation by one movement of the reciprocating member, a series of radially movable gravity dogs in the path of the teeth and differently spaced than are the teeth and a fixed support in which said dogs are mounted.

6. A means for imparting rotary motion to a reciprocatory shaft comprising a sleeve fast on said shaft and having on its outer face longitudinal pitched grooves, a collar surrounding said sleeve and having longitudinal grooves formed on its inner face, anti-friction balls engaging the pitched grooves of the shaft sleeve and the longitudinal grooves in the inner face of the collar, a supporting casing for the collar with anti-friction bearings between said collar and casing, ratchet teeth peripherally disposed upon said collar, and gravity dogs in the path of said teeth and spaced to engage a greater number of teeth than the number of dogs but which number of teeth is less than a multiple of the number of dogs.

7. A means for converting reciprocatory motion into rotary motion, comprising equally-spaced rotative ratchet teeth moved in one direction of rotation by the movement of the reciprocating member in one direction, a series of radially movable gravity dogs in the path of the teeth, and a support for the dogs having radially disposed guiding slots engaging the dogs only near the ends of the slots.

8. A means for converting reciprocatory motion into rotary motion, comprising equally-spaced rotative ratchet teeth moved in one direction of rotation by the movement of the reciprocating member in one direction, a series of radially movable gravity dogs in the path of the teeth, and a support for the dogs having radially disposed slots constituting seats for the dogs, said slots being cut away at the sides and ends of the dogs so as to engage the latter only near the outer and inner portions thereof.

9. A means for converting reciprocatory motion into rotary motion, comprising equally spaced rotative ratchet teeth moved in one direction of rotation by the movement of the reciprocating member in one direction, a series of radially movable gravity dogs in the path of the teeth, and a support for the dogs having through radial slots beyond both ends of which slots the dogs extend so that one end of the dogs is in the path of the ratchet teeth and the other end of the dogs is accessible for the removal of said dogs from the slots.

10. A means for converting reciprocatory motion into rotary motion, comprising equally-spaced rotative ratchet teeth movable in one direction of rotation by the movement of the reciprocating member in one direction, and radially movable dogs of equal thickness throughout except where engaging the ratchet teeth and wider in a direction at right angles to the plane of rotation of the ratchet teeth than the said dogs are thick in the direction of said plane.

11. A means for imparting rotary motion to a reciprocating shaft, comprising a rotatable sleeve surrounding said shaft, said sleeve being provided with equally-spaced peripheral ratchet teeth, pitched key connections between the sleeve and the shaft, a number of dogs arranged in groups, each group having the dogs spaced to embrace a less number of teeth than the lowest multiple of the number of dogs in the group and a fixed support in which said dogs are mounted.

12. A means for imparting rotary motion to a reciprocating shaft, comprising a rotatable sleeve having equally-spaced peripheral ratchet teeth, pitched key connections between the sleeve and shaft, a group of radially movable gravity dogs in the path of the teeth and spaced to embrace a less number of teeth than the lowest multiple of the number of dogs in a group and a fixed support in which said dogs are mounted.

In testimony that I claim the foregoing as my own, I have hereto affixed my signature in the presence of two witnesses.

JOHN PRUE KARNS.

Witnesses:
JOSEPH P. DEVEREAUX,
HENRY L. O'BRIEN.